United States Patent [19]

Drainas

[11] Patent Number: 4,676,186
[45] Date of Patent: Jun. 30, 1987

[54] BUTTER ROLLING DEVICE

[76] Inventor: Bill Drainas, P.O. Box 3005, Crossville, Tenn. 38555

[21] Appl. No.: 803,153

[22] Filed: Dec. 2, 1985

[51] Int. Cl.[4] ............................................. B05C 1/02
[52] U.S. Cl. ................................. 118/13; 118/202; 401/1
[58] Field of Search ................. 401/1, 208; 118/13, 118/202

[56] References Cited

U.S. PATENT DOCUMENTS

| | | | |
|---|---|---|---|
| 2,257,316 | 9/1941 | Votaw et al. | 401/208 X |
| 3,605,684 | 9/1971 | McGinley | 118/13 |
| 4,029,046 | 6/1977 | Hertel | 118/202 |

FOREIGN PATENT DOCUMENTS 155262  4/1952  Australia ............................. 118/13

Primary Examiner—John P. McIntosh
Attorney, Agent, or Firm—Pitts and Brittian

[57] ABSTRACT

A butter rolling device for applying butter/margarine to a selected surface of an item of food is disclosed. The butter rolling device (10) comprises a reservoir (12) for receiving and melting butter/margarine, the reservoir (12) defining an upper opening (28) for accessing the reservoir (12). The device (10) further comprises a rolling drum (16) rotatably mounted in the reservoir (12), the drum (16) comprising cylindrical walls (30) defining an exterior annular rolling surface (32) for being coated with butter/margarine and for rotatably engaging the selected surface of the item of food whereby butter/margarine is transferred to such selected surface. Means are also provided for rotatably mounting the rolling drum (16) in the reservoir (12).

7 Claims, 4 Drawing Figures

BUTTER ROLLING DEVICE

DESCRIPTION

1. Technical Field

The present invention relates to devices for applying butter or margarine on a selected food surface. The invention generally comprises a reservoir for receiving and melting butter or margarine, and a rolling drum rotatably mounted in the reservoir.

2. Background Art

The spreading of butter or margarine on bread or toast has long been accomplished by using a knife to manually spread the butter or margarine over the surface of the bread or toast. However, the use of a knife to spread butter is a time consuming process which undesirably lengthens the time necessary for food preparation. This is particularly true in the restaurant setting where food preparation time must be maintained at a minimum. Further, it is desirable to melt the butter or margarine before it is applied to the food such that the butter spreads evenly. Moreover, in the case of toast or other foods which should be served warm, warming the butter before it is applied to the food surface helps maintain the proper serving temperature. However, the spreading of butter or margarine is made all the more difficult where the butter or margarine is in a melted state.

Therefore, it is an object of the present invention to provide a butter rolling device for applying butter or margarine to a selected surface of an item of food.

It is another object of the present invention to provide a butter rolling device for melting butter or margarine prior to applying the butter or margarine to the selected food surface.

It is a further object of the present invention to provide a butter rolling device that reduces the time necessary to spread butter or margarine on a selected food surface, thereby reducing food preparation time.

Yet another object of the present invention is to provide a butter rolling device that is inexpensive to manufacture and maintain.

DISCLOSURE OF THE INVENTION

Other objects and advantages will in part be accomplished by the present invention which provides a butter rolling device for applying butter or margarine to a selected surface of an item of food such as bread or toast. The butter rolling device comprises a reservoir for receiving and melting butter or margarine, the reservoir defining an upper opening for accessing the reservoir. The device further comprises a rolling drum rotatably mounted in the reservoir, the drum comprising cylindrical walls defining an exterior annular rolling surface for being coated with butter or margarine and for rotatably engaging the selected surface of the item of food whereby butter or margarine is transferred to the food surface. Means are also provided for rotatably and releasably mounting the rolling drum in the reservoir.

BRIEF DESCRIPTION OF THE DRAWINGS

The above mentioned features of the invention will become more clearly understood from the following detailed description of the invention read together with the drawings in which:

FIG. 2A illustrates a side elevation view of an alternate embodiment of the butter rolling device of the present invention wherein the device is provided with a heating unit.

BEST MODE FOR CARRYING OUT THE INVENTION

Figure 1:
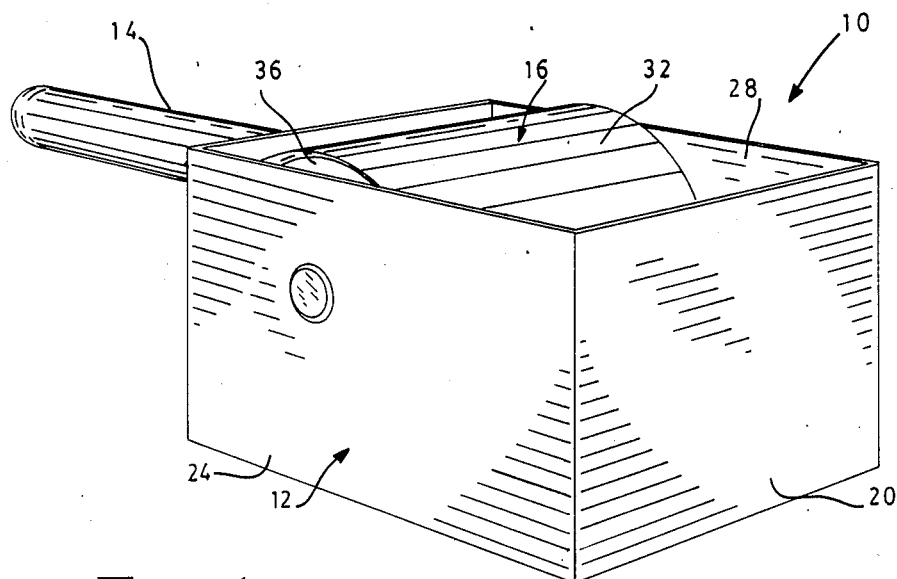
FIG. 1 illustrates a perspective view of a butter rolling device which incorporates various features of the present invention.

A butter rolling device incorporating various features of the present invention is illustrated at 10 in the figures. As will be appreciated from the discussion which follows, the device 10 provides a fast and efficient means for spreading butter on a preselected surface such as on the exterior surface of a piece of bread or toast. Whereas the device 10 will be discussed herein in terms of applying butter to a selected surface, it will be understood that the device 10 can be used to apply margarine or various other substances which are spread on food surfaces.

The butter rolling device 10 generally comprises a butter reservoir 12 provided with a suitable handle member 14, and further comprises a butter rolling drum 16 rotatably mounted within the butter reservoir 12. More specifically, the butter reservoir 12 comprises a bottom portion 18, a pair of oppositely disposed end walls 20 and 22, and a pair of oppositely disposed side walls 24 and 26. Resultantly, the reservoir 12 defines an upper opening 28 which provides access to the interior of the reservoir 12 such that butter can be placed therein. In the preferred embodiment of the device 10 the reservoir 12 is fabricated of aluminum, steel or other durable heat conductive metal such that heat can be applied to the reservoir 12, and specifically to the bottom portion 18, in order to melt the butter within the reservoir 12. It being contemplated that heat will be applied to the resevoir 12, in the preferred embodiment of the device 10 the handle member 14, secured to the end wall 22, is fabricated of a heat insulating material such that after heat is applied to the reservoir 12 the handle member 14 remains sufficiently cool to allow a user of the device 10 to hold and carry the device by grasping the handle member 14.

Figure 2:
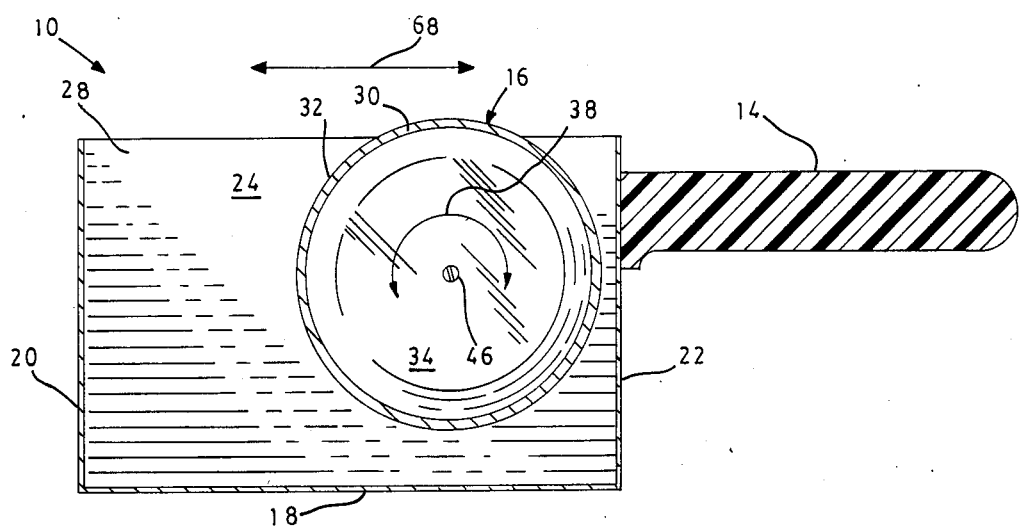
FIG. 2 illustrates a side elevation view, in section, of a butter rolling device of the present invention.
Figure 2:
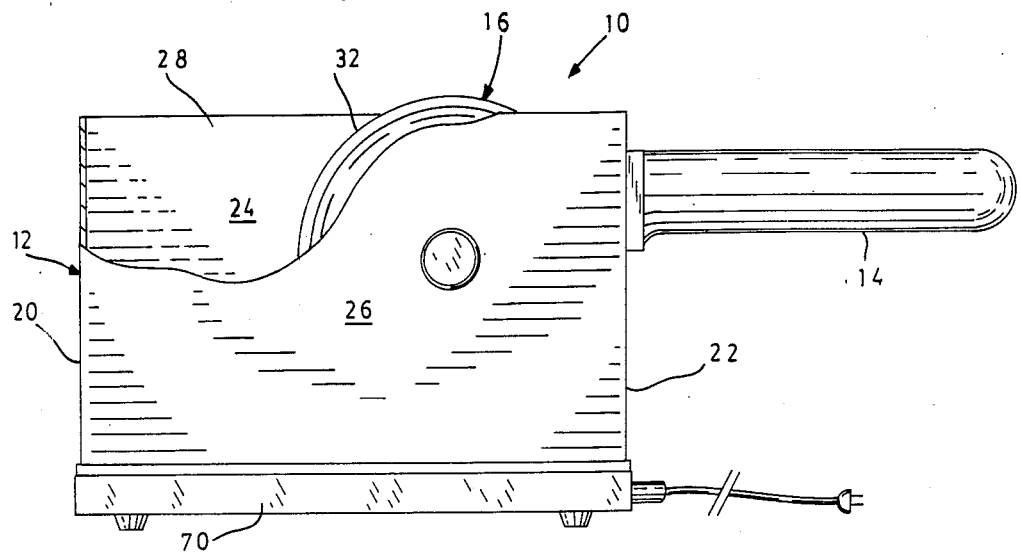

As indicated above the butter rolling device 10 also comprises a butter rolling drum 16, rotatably mounted within the reservoir 12. The drum 16 comprises a cylindrical wall 30 defining an exterior annular rolling surface 32, and further comprises oppositely disposed end walls 34 and 36. Means are also provided for rotatably mounting the drum 16 within the reservoir 12. In this regard, in the preferred embodiment the drum 16 is mounted such that the axis of the drum 16 is oriented substantially perpendicular to the side walls 24 and 26 of the reservoir 12 and such that a selected portion of the drum 16 extends through the opening 28 of the reservoir 12. Thusly mounted, it will be appreciated that the drum 16 can be rotated either clockwise or counter clockwise as indicated by the arrow 38. (FIG. 2)

Figure 3:
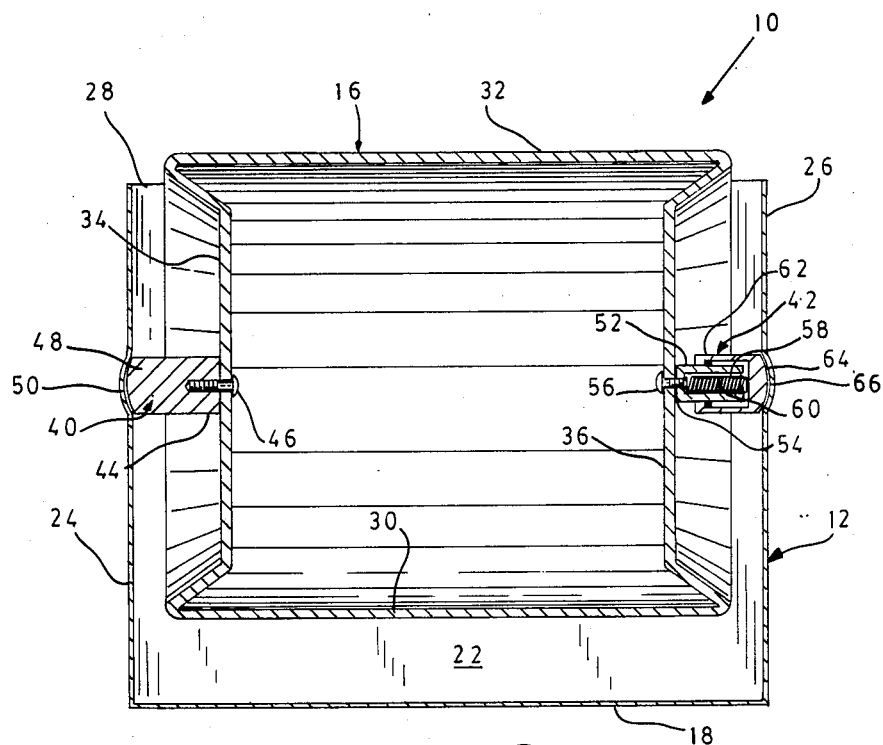
FIG. 3 illustrates a front elevation view, in section, of a butter rolling device of the present invention.

With respect to the means for mounting the drum 16 within the reservoir 12, in the preferred embodiment such means comprise a first mounting shaft 40 and a second expandable mounting shaft 42. As is best illustrated in FIG. 3, the first mounting shaft 40 comprises a first end portion 44 which is secured to the end wall 34 of the drum 16 with suitable fastening means such as the screw 46, such that the shaft 40 is substantially coaxially aligned with and extends outwardly from the drum 16. Further, the shaft 40 comprises an outboard end portion 48 defining a convex surface for being received in the concave socket 50 defined in the side wall 24.

The expandable shaft 42, also substantially coaxially oriented with the drum 16, comprises an interior shaft 52 having a first end portion 54 secured to the end wall 36 of the drum 16 with suitable fastening means such as the screw 56. Further, the interior shaft 52 defines an axially oriented annular recess 58 for receiving a spring member 60. The expandable shaft 42 also comprises a cap member 62 which is slidably received over the interior shaft 52 so as to engage the spring member 60. Further, the cap member 62 comprises as outboard end portion which defines a convexe surface 64 for being releasably received in the concave socket 66 defined in the side wall 26 of the reservoir 12. Accordingly, it will be appreciated by those skilled in the art that the spring member 60 acts against the interior shaft 52, thereby biasing the drum 16 and the shaft 40 toward the socket 50, and acts against the cap member 62, thereby biasing the cap member 62 toward the socket 66. With both of the shafts 40 and 42 secured in the sockets 50 and 66, respectively, the drum 16 is rotatably held in position within the reservoir 12. Removing the drum 16 from the reservoir 12 is simply a matter of applying sufficient axial force to the drum 16 to overcome the bias of the spring member 60, whereby the shaft 42 is compressed resulting in the shaft 40 being removed from the socket 50 freeing the drum 16 such that it can be removed from the reservoir 12. Of course, the mounting shafts 40 and 42 represent only one preferred means of rotatably mounting the rolling drum 16, and it will be appreciated that various other shaft or axle arrangements can be used if desired. For example, the expandable shaft 42 can be replaced with another mounting shaft 40 such that the outboard end portions of the two shafts 40 snap fit into the operatively associated sockets 50 and 66.

With regard to the operation of the butter rolling device 10, as indicated above, butter is placed in the reservoir 12 and melted. Of course, the melting of the butter can be accomplished by placing the device 10 on the heating element of a stove or through the use of various other heating devices. The level of melted butter within the reservoir 12 should be such that at least a portion of the rolling surface 32 of the drum 16 is submerged in the melted butter. The food surface to which butter is to be applied is then brought into contact with that portion of the rolling surface 32 which extends through the opening 28 of the reservoir 12, and with such contact being maintained, the food surface is move vertically over the device 10 in a direction substantially perpendicular to the axis of the drum 16 as indicated by the arrow 68. (FIG. 2) It will be appreciated that such movement of the food surface results in rotation of the drum 16 and travel of the rolling surface 32 of the drum across the food surface. It will also be understood that rotation of the partially submerged drum results in the coating of the rolling surface 32 with butter such that contact of the rolling surface 32 with the food surface results in a transfer of melted butter to such food surface. Thus, by simply rolling the food surface over the rolling surface 32 of the drum 16, the food surface can be coated with melted butter.

Referring now to FIG. 2A, in one preferred embodiment the butter rolling device of the present invention is provided with a built-in heating unit 70 mounted on the bottom portion of the reservoir 12. The heating unit 70 provides the heat necessary to melt the butter within the reservoir 12 and maintain the butter in a melted state. Thus, the unit 70 obviates the need for an external heat source and allows the butter to be maintained at a substantially constant temperature.

From the above it will be appreciated that the butter rolling device 10 provides a fast efficient means for applying butter to a selected surface. For example, bread or toast can be quickly buttered by simply rolling the exterior surface of the bread or toast over the rolling drum 16. Accordingly, the device 10 is particularly useful in situations where numerous pieces of bread must be buttered as in a restaurant where manually spreading butter undesirably lengthens food preparation time.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A device for applying butter/margarine to a selected surface of an item of food, said device comprising:
   a reservoir for receiving and melting said butter/margarine, said reservoir consisting of a bottom portion, first and second oppositely disposed end walls and first and second oppositely disposed side walls each joined to said bottom portion and thereby defining an upper opening for accessing said reservoir, said first side wall provided with a first concave socket on an inner surface and said second side wall provided with a second concave socket on an inner surface aligned with said first concave socket;
   a rolling drum having an axis rotatably mounted in said reservoir, said drum having first and second end walls joined to a cylindrical wall defining an exterior annular rolling surface for being coated with said butter/margarine and for rotatably engaging said selected surface of said item of food whereby said butter/margarine is transferred to said selected surface; and
   means for rotatably and releasably mounting said rolling drum in said reservoir, said means including a first shaft attached to and extending from said first end wall of said drum terminating in a free end having a first convex surface to be rotatably and releasably held in said first concave socket, and a second shaft attached to and extending from said second end wall of said drum terminating in a free end having a second convex surface to be rotatably and releasably held in said second concave socket, said first and second shafts aligned with said axis of said drum.

2. The device of claim 1 wherein said reservoir is provided with a handle member for holding and transporting said device, said handle member joined to and extending substantially perpendicular to an outside surface of one of said end walls of said reservoir.

3. The device of claim 1 wherein said reservoir further comprises a heating unit for melting said butter/- margarine disposed proximate said bottom portion of said reservoir.

4. The device of claim 1 wherein said rolling drum is mounted within said reservoir such that a selected portion of said rolling surface of said drum extends through said upper opening in said reservoir so as to facilitate contact between said rolling surface and said selected surface of said item of food.

5. A device for applying melted butter/margarine to a selected surface of an item of food, said device comprising:

a reservoir for receiving and melting said butter/margarine, said reservoir comprising a bottom portion, first and second oppositely disposed end walls, and first and second oppositely disposed side walls, said reservoir defining an upper opening for accessing said reservoir, said first side wall of said reservoir defining a first concave mounting socket and said second side wall of said reservoir defining a second concave mounting socket facing said first concave socket, said reservoir further comprising a handle member secured to and extending from said second end wall for holding and transporting said butter rolling device;

a rolling drum rotatably mounted in said reservoir, said drum having a cylindrical wall defining an exterior annular rolling surface for being coated with said butter/margarine and for rotatably engaging said selected surface of said item of food whereby said butter/margarine is transferred to said selected surface, said rolling drum further having first and second oppositely disposed end walls; and means for rotatably mounting said rolling drum in said reservoir, said means comprising a first mounting shaft secured to and extending outwardly from said first end wall of said rolling drum so as to be substantially coaxially aligned with said rolling drum, said first mounting shaft defining an outboard end portion with a convex end surface for being rotatably received in said first concave mounting socket of said first side wall of said reservoir, said means further comprising a second mounting shaft, said second mounting shaft comprising an interior shaft secured to and extending outwardly from said second end wall of said rolling drum so as to be substantially coaxially aligned with said rolling drum, said interior shaft defining an axially aligned cylindrical recess, said second mounting shaft further comprising a cap member for being slidably received over said interior shaft, said cap member defining an outboard end portion with a convex end surface for being rotatably received in said second concave mounting socket of said second side wall of said reservoir, said means further comprising a spring member mounted within said cylindrical recess of said internal shaft whereby said spring member acts against said internal shaft and said cap member thereby biasing said first mounting shaft toward said first concave mounting socket and said second mounting shaft toward said second concave mounting socket, whereby said rolling drum is releasably and rotatably secured in said reservoir.

6. The device of claim 5 wherein said reservoir further comprises a heating unit for melting said butter/margarine, said heating unit disposed in contact with said bottom portion of said reservoir.

7. The device of claim 5 wherein said rolling drum is mounted within said reservoir such that a selected portion of said rolling surface of said drum extends through said upper opening in said reservoir so as to facilitate contact between said rolling surface and said selected surface of said item of food.

* * * * *